US007440837B2

(12) United States Patent
Kulzer et al.

(10) Patent No.: US 7,440,837 B2
(45) Date of Patent: Oct. 21, 2008

(54) MECHANISM FOR INTERCONNECTING INDEPENDENT FUNCTIONALITIES OF AN ENGINE CONTROLLER

(75) Inventors: Josef Kulzer, Schmidgaden (DE); Harald Tschochner, Vohenstrauβ (DE); Freddy Veit, Neukirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/666,050

(22) PCT Filed: Sep. 27, 2005

(86) PCT No.: PCT/EP2005/054851

§ 371 (c)(1), (2), (4) Date: May 22, 2007

(87) PCT Pub. No.: WO2006/048358

PCT Pub. Date: May 11, 2006

(65) Prior Publication Data

US 2007/0294021 A1 Dec. 20, 2007

(30) Foreign Application Priority Data

Oct. 20, 2004 (DE) ...................... 10 2004 051 168

(51) Int. Cl.
*G06F 19/00* (2006.01)

(52) U.S. Cl. ..................................................... 701/102

(58) Field of Classification Search ................. 701/102, 701/101, 115
See application file for complete search history.

(56) References Cited

U.S. PATENT DOCUMENTS

| | | | | |
|---|---|---|---|---|
| 5,247,540 | A | 9/1993 | Hoge | |
| 6,161,190 | A | 12/2000 | Fischer et al. | |
| 2002/0005557 | A1 | 1/2002 | Kodama | |
| 2004/0190491 | A1 * | 9/2004 | Peers | 370/351 |

FOREIGN PATENT DOCUMENTS

| | | | |
|---|---|---|---|
| DE | 42 05 271 | C1 | 1/1993 |
| DE | 197 22 114 | A1 | 12/1998 |
| DE | 103 08 460 | A1 | 9/2004 |
| EP | 0 682 303 | A1 | 11/1995 |

OTHER PUBLICATIONS

English abstract of German Patent DE 42 05 271 C1 (Kienzle et al.), dated Jan. 14, 1993.

(Continued)

*Primary Examiner*—Hieu T Vo
(74) *Attorney, Agent, or Firm*—Laurence A. Greenberg; Werner H. Stemer; Ralph E. Locher

(57) ABSTRACT

Electronic engine controllers contain a multitude of individual components that, in part, trigger one another. Until now, a change made to these trigger connections required a change, for example, in the source code of the engine controller. According to the invention, all trigger connections are realized by interconnecting wrappers, which receive the trigger signal from a component and—optionally after translating the trigger signal into a trigger signal of a differing type route this trigger signal to the second component to be triggered. In order to produce or change a trigger connection, it is only required to change the configuration of the wrappers.

11 Claims, 3 Drawing Sheets

OTHER PUBLICATIONS

English abstract of European Patent Application EP 0 682 303 A1 (Burger), dated Nov. 15, 1995.

English abstract of German Published Non-Prosecuted Patent Application DE 103 08 460 A1 (Hammel et al.), dated Sep. 2, 2004.

Beitz et al.: "Dubbel Taschenbuch für den Maschinenbau", 1997, and English translation thereof.

Beitz et al.: "Dubbel Taschenbuch für den Maschinenbau", 1997.

* cited by examiner

MECHANISM FOR INTERCONNECTING INDEPENDENT FUNCTIONALITIES OF AN ENGINE CONTROLLER

BACKGROUND OF THE INVENTION

1. Field of the Invention

The invention relates to an engine controller for controlling processes of the drivetrain (engine and/or drives) in motor vehicles having combustion engines (gasoline or diesel engines). The term engine controller here denotes both an engine control device and also a complex of functionalities, which are required to control an engine.

2. Prior Art

One of the decisive fields of application of microelectronics in modern motor vehicles is among others the control of the drivetrain. The regulation of the idling speed, the lambda control and the regulation of the electronic ignition system play a paramount role here. An active engine regulator and an adaptive drive controller are essential means for adjusting the systems to the respective driving situation.

Regulators in motor vehicles are very complex as a result of their numerous input and output variables, so that modern regulating systems based on microcontrollers are used to realize these tasks.

As more and more different sensors are being used in modern motor vehicles, the measuring data of which must be considered at the same time, the number of input/output ports in an engine controller has constantly increased. Microcontrollers with very high computing power are thus used increasingly.

Engine controllers are generally of a modular design, made from individual components, which trigger one other. Components can be microcontrollers or other hardware or however also software components and/or software functionalities. The communication between the individual components of the engine control systems is realized by way of electrical or software connections. If the communication consists of a pure trigger process, reference is made to a trigger connection. Software connections can be realized for instance via interfaces by way of a bus, with priority interrupts being used. The software must be changed for each required new connection, or new electrical connections must be created. Each change in the constellation of the components for the engine controller is thus associated with a considerable outlay.

BRIEF SUMMARY OF THE INVENTION

Object

The object of the invention is to enable engine control systems to be configured easily and to facilitate the reuse of different standard components in different engine controllers and/or in changed connections between the individual components.

Solution

This object is achieved by the inventions having the features of the independent claims. Advantageous developments of the inventions are characterized in the subclaims. All the claims are thus worded with reference to the content of this description.

An engine controller and a method are proposed, having a plurality of first components, which each execute a function and having a plurality of second components, which each generally execute another function. The first and second components can be microcontrollers or other hardware or however also software components.

In this way, each first component triggers a second component in each instance with a trigger signal. The first component controls the required signal generation via the microcontroller register. Hardware signals, e.g. of the ECL or TTL type (having a level or 5V or increasingly 3.3V) can be used as signal types, so too however can software signals (start signal, triggering signal, setting a flag, interrupt for triggering an interrupt server routine, which is processed in real-time for instance, . . . ).

The described signals are triggers, which only contain pure time information for triggering a specific event, but no further information. If additional information is required by the second component, this must be requested by the first component. The trigger time is defined as the time of the edges (rising or falling) of the trigger in the case of hardware signals. The basis for the generation of a software interrupt can also be a hardware signal generated in the control system.

In this process, a trigger connection between the respective first component and the respective second component is assigned to each trigger signal. Approximately 50 to 100 of such trigger connections exist in modern motor vehicles.

In such cases each first component contains a signal generating unit for generating the trigger signal. At the same time, each second component contains a receiver unit for receiving the trigger signal.

Furthermore, the engine controller contains a plurality of wrappers (signal converters and/or adaptation elements), which are assigned in each instance to a first component. The wrappers themselves can be microcontrollers or modules in a microcontroller. They generate a software or hardware signal as a function of the attributes of the second component.

Each trigger connection between a first component and a second component is realized here by interconnecting a wrapper assigned to the first component between the signal generating unit of the first component and the receiver unit of the second component.

The respective first component can transmit the trigger signal generated by itself to the wrapper, which can generate a second trigger signal after receipt of a trigger signal from the first component. The signal type of the second trigger signal corresponds to the type, with which the second component can be triggered.

The wrapper takes over this adaptation between the signal type at the output of a first component and the signal type expected from a second component. In this process, the wrapper transforms and forwards the recorded signals. In such cases the wrapper takes account of:

the type of the signal supplied by the first component the type of the signal expected by the second component.

The wrapper is designed such that it can generate a second trigger signal of a differing signal type after receipt of a trigger signal of a first signal type, said trigger signal being generated from the first component.

Precisely one wrapper must be defined and configured for each connection to be created between an independent first and an independent second component. The wrapper can transmit the second trigger signal generated by itself to the respective second component and it is consequently possible to configure which signal type of the second trigger signal it generates and to which second component it transmits the second trigger signal.

The configurability of the wrapper allows different control modules to be combined and coordinated with one another. In this way, only the trigger connections are reconfigured, i.e. only the configuration of the wrappers is changed by means of an update. Configuration here generally means the setting of predefined values at specific positions, memories, bits, flags, parameters etc. Standardized components can be used on this basis in different control systems, without the signal type generated from a first component having to match the signal type of a second component concretely. The individual components can be implemented completely independently of with which components they interact.

The wrapper, which at the same time can also be a microcontroller, is configured such that it generates a hardware or software signal at its output as a function of the attributes of the second component. The microcontroller is programmed once during the configuration of the system, in particular when the engine is started up. The data for the desired configuration is stored in a non-volatile memory. The data stored in this memory contains the information for the configuration of the wrappers. Only the content of the non-volatile memory must be changed for an update.

With the realization of a hardware signal at the output of the wrapper, a physical connection between a first component at the input and a second component at the output of the wrapper is only connected in the form of a statistical configuration. If a software signal is required at the output of the wrapper, then the wrapper receives an input signal of a specific type and generates a new software signal at its output, said software signal being received by the second component and being able to be converted into the desired action.

The wrappers are programmed here such that they ensure the adaptation of the different signal types required for each connection between a first and a second component. The invention is characterized in that with each change in the connection from a first component to another second component by means of a rapidly realizable update, only the configuration of the corresponding wrapper needs to be matched to the changed requirements. This considerably reduces the time required to produce new connections between the first and second components and thereby also the time required for the implementation of changes and updates.

By interconnecting the wrappers in the trigger connections, it is possible to reuse standard components of the engine controller e.g. for different control devices, engines and/or different car manufacturers. A first component can also trigger a completely different second component, the first components do not contain any information relating to which second component they trigger. This information is located in the configuration file and/or in the wrappers.

A wrapper, as is used in the present invention, can also be designed such that after receipt of a first trigger signal of a first signal type generated by the first component, it can produce a second trigger signal of a differing signal type. This is necessary if a first component, which can generate a first signal type, is to trigger an action or an event on a second component, which can however only receive a signal of a signal type differing from the first component. To ensure that the second component can be triggered by the first, the signal from the first component is translated in the wrapper into a signal of the type, which can be received by the second component, i.e. an adaptation of the signal type generated by the first component into a signal type compatible for triggering the second component is carried out in the wrapper.

The wrapper can also be designed such that it can generate the second trigger signal with a predetermined delay after receipt of a trigger signal generated by the first component.

Individual method steps are described in more detail below. The steps must not necessarily be carried out in the specified sequence, and the method to be illustrated can also feature further steps (not mentioned).

With the method according to the invention, a plurality of first components is made available within the motor controller, said components executing a function in each instance. A plurality of second components is likewise made available, which execute a function in each instance. In this way, each first component is selected such that it can trigger a second component with a trigger signal in each instance. With this process, a trigger connection between the respective first component and the respective second component is assigned to each trigger signal. Each first component is selected such that it contains a signal generating unit for generating the trigger signal. At the same time, each second component is selected such that it contains a receiver unit for receiving the trigger signal.

Furthermore, a plurality of wrappers which are assigned to a first component in each instance is made available. Each trigger connection between a first component and a second component is realized in that the wrapper assigned to the first component is interconnected between the signal generating unit of the first component and the receiver unit of the second component.

The respective first component is selected such that it can transmit the trigger signal generated by itself to the wrapper and the wrapper is selected such that it can generate a second trigger signal after receipt of the trigger signal from the first component. In this way, the signal type of the second trigger signal is selected such that it corresponds to the type with which the second component can be triggered.

Furthermore, the wrapper is selected such that it can transmit the second trigger signal generated by itself to the respective second component and it is consequently possible to configure which signal type of the second trigger signal it generates and to which second component it is to transmit the second trigger signal. The trigger connections between the first and second components are defined by the configuration of the wrapper prior to execution of the engine controller.

The wrappers can be realized as objects or classes in a program code, said objects or classes providing an encapsulated functionality. In this example, a wrapper is only a function which is called up using specific parameters (signal type, receiver).

In this way, software interfaces which allow existing software components to be reused are created by means of the invention. These interfaces are configured with the integration of the software components. In the course of the integration, the individual software components are merged with an operating overall software. A wrapper is generated and configured in this way for each required trigger connection, said wrapper only being assigned to a respective first component. Only the wrappers contain the information relating to which first component with its signal is to trigger which second component and which signal type can be received from the second component.

If a trigger connection is to be changed, then the configuration of the assigned wrapper must also be changed. It is advantageous that the first and second components remain unchanged in this process and can thus be used universally in an advantageous manner, whereas only the wrappers have to be configured.

A change in a trigger connection previously required a change in the source code. In accordance with the invention, only the configuration must be changed. Only the functionality of the wrapper is called up with another parameter.

The scope of the invention also includes a computer program which implements the method according to the invention in one of its embodiments during operation on a computer or computer network.

Furthermore, a computer program product having program code means for implementing the method according to the invention in one of its embodiments, if the program is run on a computer or computer network, is part of the scope of the invention. In particular, the program code means can be stored on a machine-readable data carrier.

Furthermore, a data carrier on which is stored a data structure, which can implement the method according to the invention in one of its embodiments after charging in a working memory and/or main memory, is part of the scope of the invention.

A computer program product having program code means stored on a machine-readable carrier for implementing the method according to the invention in one of its embodiments, if the program is run on a computer or a computer network, is also part of the scope of the invention.

In such a definition a computer program product is taken to mean the program as a tradable product. It can basically be available in any form, so that it can be distributed on paper for instance or a machine-readable data carrier and can in particular be distributed over a data transmission network.

Finally, a modulated data signal which contains instructions which can be run by a computer system or computer network for implementing a method as claimed in one of the preceding method claims is part of the scope of the invention.

Further details and features of the invention emerge from the subsequent description of preferred exemplary embodiments in conjunction with the subclaims. In this case, the respective features can be implemented on their own or in combination with one another. The invention is not restricted to the exemplary embodiments.

The exemplary embodiments are shown schematically in the figures. Identical reference characters in the individual figures refer here to identical or functionally-identical elements and/or elements corresponding to one another in respect of their functions, in which;

BRIEF DESCRIPTION OF THE SEVERAL VIEWS OF THE DRAWING

FIG. 3 shows a detailed basic diagram of the control of the signal flow during a change in the signal connection

DESCRIPTION OF THE INVENTION

Figure 1:
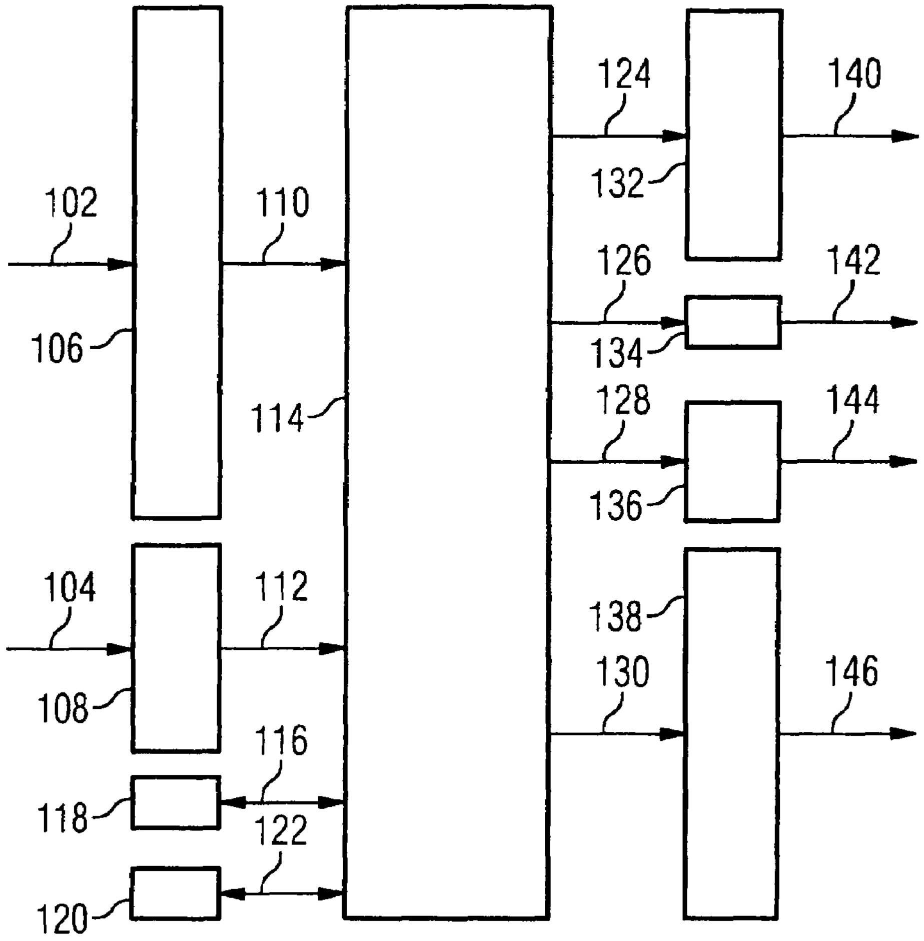
FIG. 1 shows a detailed basic diagram of an engine controller.

FIG. 1 shows the basic diagram of an engine controller. With the engine controller shown, the signal flow is carried out by the different sensors and set point devices 102 (e.g. accelerator adjustment, throttle position, air mass, battery voltage, intake air temperature, engine temperature, knocking intensity, lambda probes) and 104 (e.g. crankshaft speed, camshaft position, gear speed, speed) via the input/output ports 106 and 108 and further from the ports to the microcontroller 114 and its components by way of the connections 110 and 112.

The data is transferred between the microcontroller 114 and the CAN bus 118 by way of the connection 116. The CAN bus 118 ensures that all devices are networked with one another via a single cable. The data is transferred between the microcontroller 114 and a diagnosis system 120 by way of the connection 122.

The microcontroller 114 with its components realizes its function on the basis of a program which is permanently stored in the ROM. After the signal processing in the microcontroller 114, the further signal flow is carried out via the connections 124, 126, 128, 130 and via the input/output ports 132, 134, 136, 138 to the different actuators 140 (e.g. ignition coils and spark plugs), 142 (e.g. throttle setting element), 144 (e.g. injection valves) and 146 (e.g. main relay, engine speed gager, fuel pump relay, heating, lambda probe, camshaft controller, fuel ventilation, manifold changeover, secondary air, exhaust gas recirculation). The adapter system having wrappers as well as a first and second component is also integrated into the engine controller. The wrappers can be both components of the microcontroller 114 and also the microcontroller itself.

Figure 2:
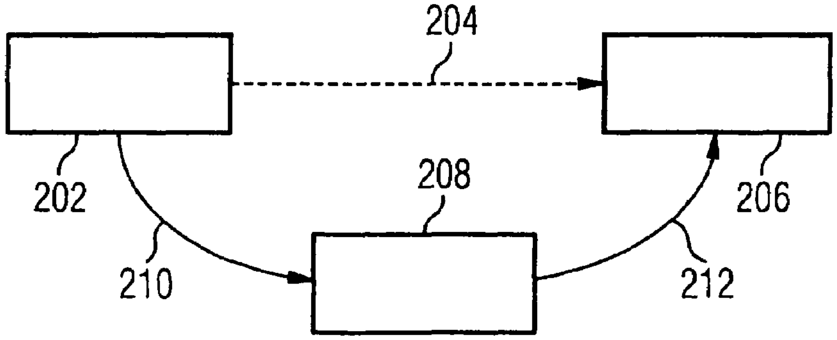
FIG. 2 shows a detailed basic diagram of the control of the signal flow during interconnection of a wrapper

FIG. 2 shows the basic diagram of the signal flow between a first and a second component using a wrapper. A first component 202 is to trigger a specific event on a second component 206 via a trigger connection 204. The first component 202 generates a signal of a specific type (e.g. a TTL signal), with which the second component 206 is to be triggered. The second component 206 can however only process signals of another type (e.g. a software trigger signal). To realize this function, it is necessary to connect a wrapper 208 between the first and the second component. The wrapper 208 takes over the function of adapting the signals between the first component 202 and the second component 206. To this end, the TTL signal of the first component 202 is transmitted to the wrapper 208 via the trigger connection 210. The received TTL signal is transformed into a software trigger signal by the wrapper 208. The software trigger signal is transmitted to the second component 206 by way of the trigger connection 212. The second component 206 is thus triggered by a signal from the first component 202 by way of the interconnection of the wrapper 208.

FIG. 3 shows the basic diagram of the signal flow during a change in the connection between a number of first and second components.

Figure 3A:
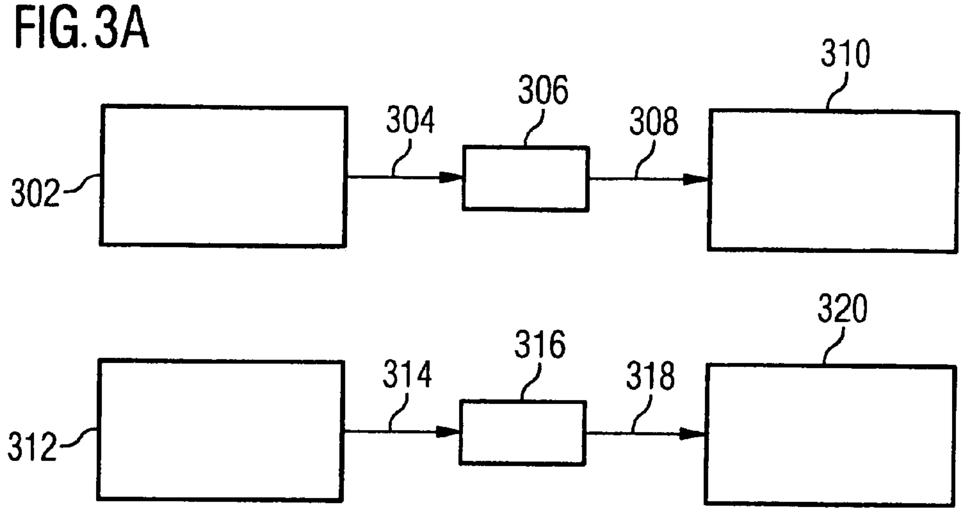
FIG. 3A shows a detailed basic diagram of a first trigger constellation between four components.

In FIG. 3A, a trigger signal is sent from a first component 302 to an interconnected wrapper 306 by way of a trigger connection 304. The wrapper 306 receives the trigger signal, generates a new trigger signal, if necessary of another type and transmits this new trigger signal to a second component 310 by way of the trigger connection 308. In this way, an action on the second component 310 is triggered by a trigger signal from the first component 302.

A trigger signal is sent to an interconnected wrapper 318 from a further first component 312 via a trigger connection 314.

The wrapper 316 receives this trigger signal, generates a new trigger signal, if necessary of another type, and transmits this new trigger signal to another second component 320 by way of the trigger connection 318. An action on the second component 320 is herewith triggered by a trigger signal from the first component 312.

FIG. 3A thus shows a constellation, in which the first component 302 triggers the second component 310. At the same time, the first component 312 triggers the second component 320.

Each of these wrappers 306 and/or 316 is assigned to a first component 302 and/or 312 and is configured according to the requirements of the trigger connection to be realized with a respective second component 310 and/or 320.

Figure 3B:
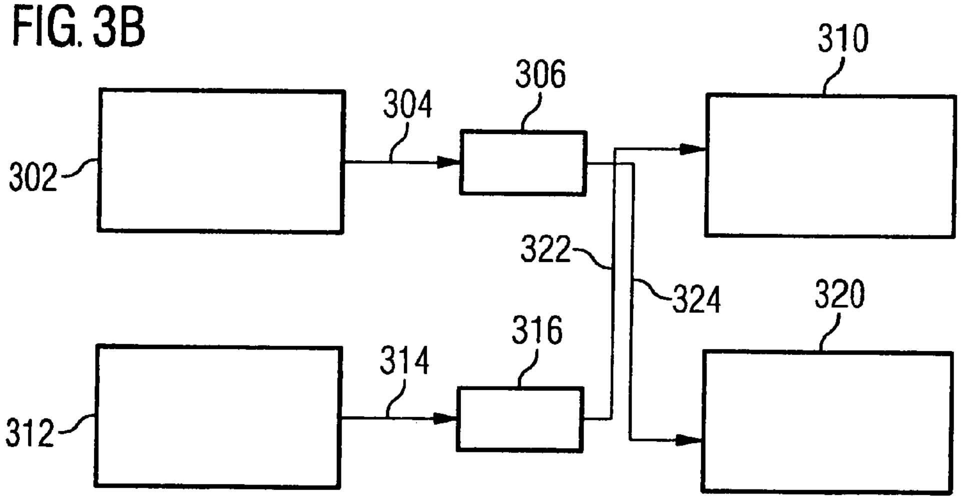
FIG. 3B shows a detailed basic diagram of a changed trigger constellation in comparison with FIG. 3A.

Reference is subsequently made to FIG. 3B. With a change in the trigger connections between the first and second components 302 and/or 312, the interconnected wrappers 306 and/or 316 must be reconfigured. As a result of this connection change and the reconfiguration of the wrappers 306 and/or 316, an action of the second component 310 is now triggered by a trigger signal from the first component 312, whereas an action of the second component 320 is triggered by a trigger signal from the first component 302. The new trigger connection 322 from the wrapper 306 to the second component 320 and the new trigger connection 324 from the wrapper 316 to the second component 310 were created by means of the changed configuration of the wrappers 306 and 316.

Aside from other control processes, the invention is also used inter alia with the control of the throttle valve in motor vehicles.

Figure 4:
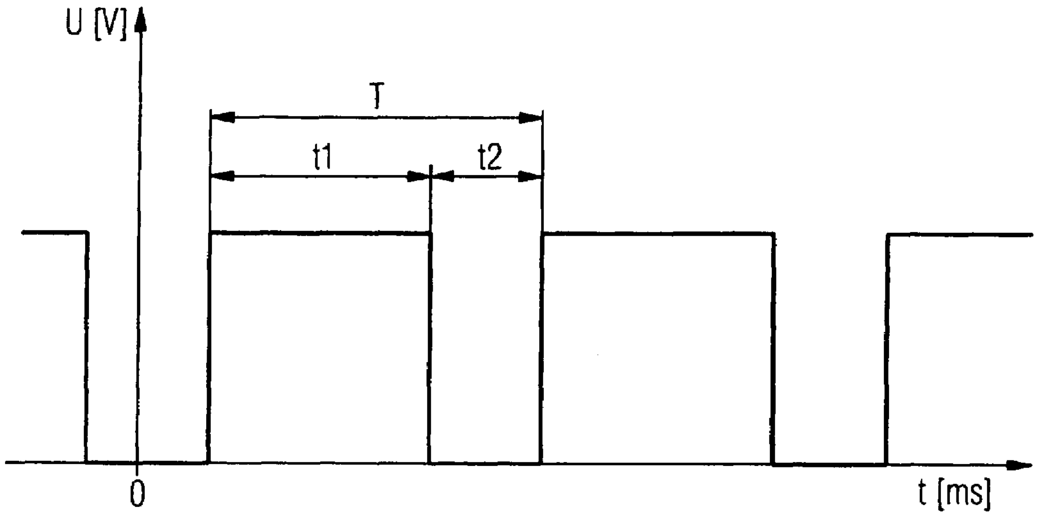
FIG. 4 shows a detailed basic diagram of the voltage-time diagram of a PWM signal for throttle control.

FIG. 4 shows a voltage-time diagram of a pulse-width modulated signal (PWM-signal), which can be used to control the throttle valve in a motor vehicle. With the pulse-width modulation, the overall time T of each period is subdivided into the turn-on time t1 and the turn-off time t2 of the rectangular signal. t1 and t2 are changeable with a fixed fundamental frequency 1/T. One of the main applications for the pulse-width modulation is the control of engines for instance.

The data is prepared on the basis of the measured value arriving from the pedal sensor in the microcontroller of the engine controller. In a first software component, a control signal for the immediate control of the drive engine of the throttle valve (throttle setting element) is generated in the form of a PWM signal. This signal also reaches a signal receiver by way of a correspondingly configured wrapper, said signal receiver triggering the detection of the measured value from the angular sensor of the throttle valve by way of an AD converter realized on the microcontroller. In this example, the first component, which generates the PWM signal, thus triggers the AD converter as the second component. The rising edge of the PWM signal is the trigger signal.

The invention claimed is:

1. An engine controller, comprising:

a) a plurality of first components each executing a function;

b) a plurality of second components each executing a function;

c) each said first component triggering a respective said second component with a trigger signal;

d) each trigger signal having a trigger connection associated therewith between the respective said first component and the respective said second component;

e) each said first component containing a signal generating unit for generating the trigger signal;

f) each said second component containing a receiver unit for receiving the trigger signal;

g) a plurality of wrappers each associated with a respective said first component;

h) each trigger connection between a respective said first component and a respective said second component being implemented by interconnecting said wrapper assigned to said first component between said signal generating unit of said first component and said receiver unit of said second component;

i) the respective said first component being configured to transmit the trigger signal generated thereby to said wrapper;

j) said wrapper being configured to generate a second trigger signal after receipt of the trigger signal from said first component;

k) a signal type of the second trigger signal corresponding to a signal type with which said second component can be triggered;

l) said wrapper being configured to transmit the second trigger signal generated thereby to said second component in each instance; and m) said wrapper being configurable which signal type of the second trigger signal said wrapper generates and to which said second component said wrapper transmits the second trigger signal.

2. The engine controller according to claim 1, wherein said wrapper is configured, after receiving a trigger signal of a first signal type generated by said first component, to generate a second trigger signal of a different signal type.

3. The engine controller according to claim 2, wherein said wrapper is configured to generate the second trigger signal with a predetermined delay after receiving the trigger signal generated by said first component.

4. An engine control method, which comprises the following steps:

a) providing a plurality of first components each executing a function;

b) providing a plurality of second components each executing a function;

c) selecting each first component to be capable of triggering a second component with a trigger signal;

d) assigning each trigger signal a trigger connection between a respective first component and a respective second component;

e) selecting each first component to contain a signal generating unit for generating the trigger signal;

f) selecting each second component to contain a receiver unit for receiving the trigger signal;

g) providing a plurality of wrappers, each assigned to a first component;

h) implementing each trigger connection between a first component and a second component by interconnecting the wrapper assigned to the first component between the signal generating unit of the first component and the receiver unit of the second component;

i) selecting the respective first component to be capable of transmitting the trigger signal generated thereby to the wrapper;

j) selecting the wrapper to be capable of generating a second trigger signal after receiving the trigger signal from the first component;

k) selecting a signal type of the second trigger signal to correspond to a type with which the second component can be triggered;

l) selecting the wrapper to be capable of transmitting the second trigger signal generated thereby to the respective second component;

m) selecting the wrapper to be capable of configuring which signal type of the second trigger signal the wrapper generates and to which second component the wrapper transmits the second trigger signal; and n) prior to executing an engine control process, establishing the trigger connections between the first and the second components by configuring the wrapper.

5. A computer program configured to implement the method according to claim 4 when operated on a microcontroller, a computer, a microcontroller network, or a computer network.

6. A computer program formed of program code configured to carry out the method according to claim 4 when the program code is executed on a microcontroller, a computer, a microcontroller network, or a computer network.

7. The computer program according to claim 6 stored on a machine-readable data carrier.

8. A data carrier, having stored thereon a data structure configured, upon loading into a working memory and/or a main memory of a computer or computer network, to execute the method according to claim 4 with the computer or computer network.

9. A computer system having stored therein a data structure configured, upon loading into a working memory and/or a main memory, to execute the method according to claim 4 with the computer system.

10. A computer program product, comprising a machine-readable carrier having computer-executable program code stored thereon configured to execute the method according to claim 4 when the computer-executable program code is executed on a computer or a computer network.

11. A modulated data signal carrying computer-executable code instructions which, when executed by a computer system or a computer network, carry out the method according to claim 4.

* * * * *